(12) United States Patent
Tretiakov

(10) Patent No.: US 6,227,058 B1
(45) Date of Patent: May 8, 2001

(54) HIGH PRECISION FLOW METER FOR MEASURING A GASEOUS VOLUME FLOW IN A PIPE

(75) Inventor: Sergei Tretiakov, Minsk (BY)

(73) Assignee: Peus-Systems GmbH, Bruchsal (DE)

( * ) Notice: Subject to any disclaimer, the term of this patent is extended or adjusted under 35 U.S.C. 154(b) by 0 days.

(21) Appl. No.: 09/032,736

(22) Filed: Feb. 27, 1998

(30) Foreign Application Priority Data

Jul. 1, 1997 (DE) .............................................. 197 27 960

(51) Int. Cl.[7] ....................................................... G01F 1/32
(52) U.S. Cl. ........................................................ 73/861.23
(58) Field of Search .......................... 73/861.28, 861.23, 73/861.29, 861.31, 861.27

(56) References Cited

U.S. PATENT DOCUMENTS

| Re. 28,686 | * | 1/1976 | Coulthard | 73/194 |
|---|---|---|---|---|
| 4,787,252 | * | 11/1988 | Jacobson et al. | 73/861.28 |
| 5,214,966 | * | 6/1993 | Delsing | 73/861.28 |
| 5,650,572 | * | 7/1997 | Vontz | 73/861.28 |
| 5,792,962 | * | 8/1998 | Constant et al. | 73/861.04 |

FOREIGN PATENT DOCUMENTS

| 195 30 807 A1 | 2/1997 | (DE) . |
|---|---|---|
| 195 48 882 A1 | 7/1997 | (DE) . |
| 196 48 784 A1 | 12/1997 | (DE) . |

OTHER PUBLICATIONS

German Utility Model G 92 01 533.6, dated May 14, 1992, arrangement for measuring a dust laden gas flow.
International Patent Application WO 93/03334 (Dorr), dated Feb. 18, 1993.
R. Lauer: "Ultraschall–Messgerät für Gasgeschwindigkeiten", Ultrasonic measurement system for gas flows, Technisches Messen 51. Jahrgang 1984 Heft 2, pp. 47–51.

* cited by examiner

Primary Examiner—Benjamin R. Fuller
Assistant Examiner—Jewel V. Thompson
(74) Attorney, Agent, or Firm—Herbert L. Lerner; Laurence A. Greenberg; Werner H. Stemer

(57) ABSTRACT

An apparatus for measuring a volume flow of a gaseous medium in a pipe with a high time resolution includes a first sonic transmitter which generates first sonic signals. The first sonic signals are deflected by a first deflecting mirror in a direction towards a first sonic receiver before passing through the pipe along a predetermined path. The path is configured at an angle relative to the volume flow. The apparatus further includes a second sonic transmitter for generating second sonic signals. The second sonic signals are deflected by a second deflecting mirror in a direction towards a second sonic receiver which is located at the opposite end of the path. The first and the second sonic receivers are located in the surface of the deflecting mirrors in such a way, that the first and second sonic signals impinge on the sonic receivers before entering the path, thereby generating respective trigger signals which are supplied to a control and measuring unit. From the trigger signals, the control and measuring unit determines the run times of the first and second sonic signals, and afterwards computes the volume flow of the gaseous medium in the pipe on basis of the run times.

13 Claims, 6 Drawing Sheets

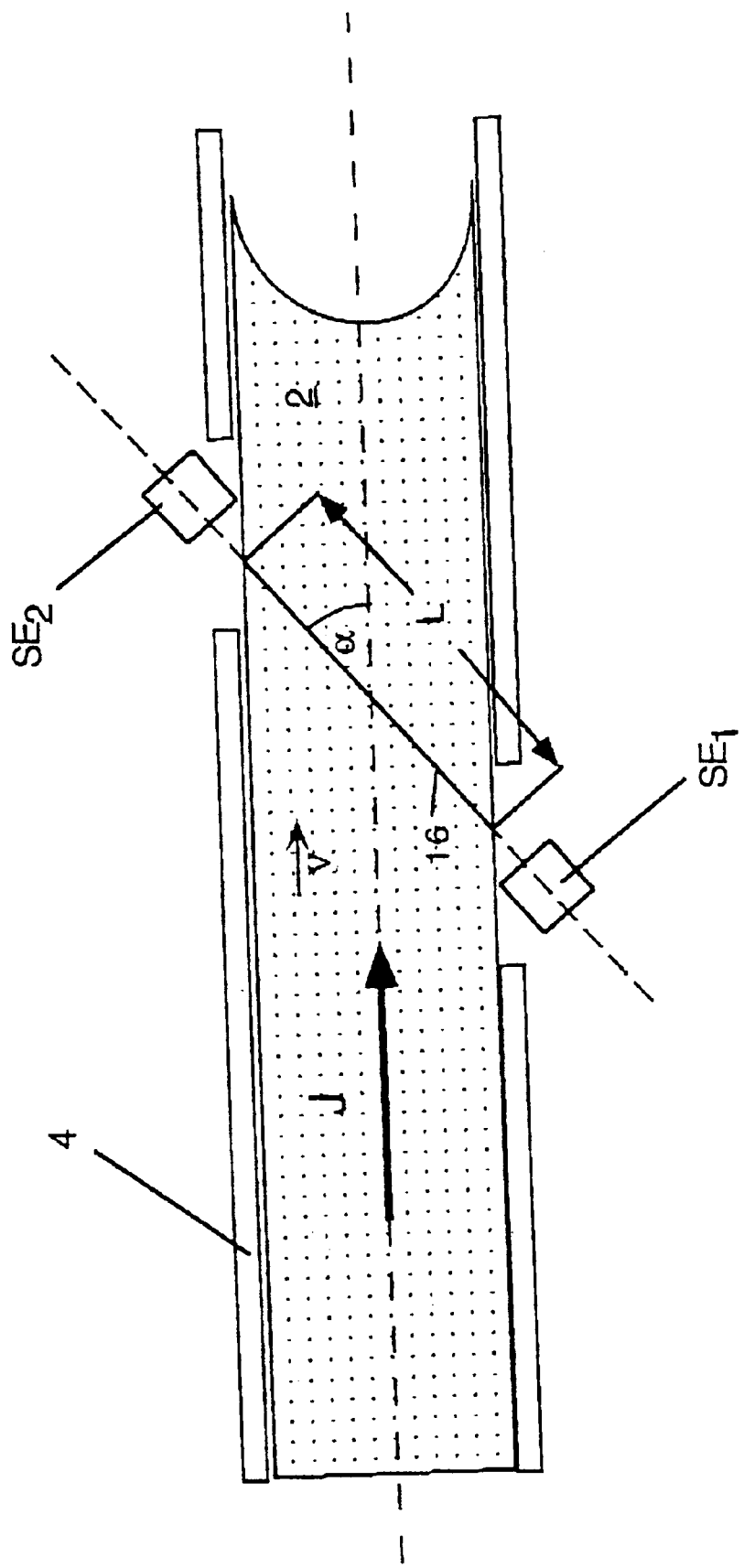

HIGH PRECISION FLOW METER FOR MEASURING A GASEOUS VOLUME FLOW IN A PIPE

BACKGROUND OF THE INVENTION

Field of the Invention

The invention relates to a high precision flow meter for measuring a gaseous volume flow in a pipe. In particular, the invention relates to a high time resolution flow meter for measuring the volume flow of an exhaust gas in a pipe of an internal combustion engine.

In the prior art, flow meters are used for monitoring the time history of an exhaust gas flow of an internal combustion engine during various testing cycles of the engine, in which different driving conditions of a motor vehicle are simulated.

From the dissertation of Mr. Andreas Hess, Langstraße 18, 7526 Weiher, Germany, titled "Sensor for Dynamic Volume Flow Determination in a Diluted Exhaust Gas of a Motor Vehicle", which was written in co-operation with the Politechnic Mannheim, Department Communication Engineering, dated 1993, it is known to determine the volume flow of an exhaust gas by measuring the run time differences of ultrasonic signals travelling obliqely through the volume flow from a first sonic transmitter to a first sonic receiver and substantially in the opposite direction from a second sonic transmitter to a second sonic receiver on the basis of the so-called "run time difference method". According to this method, the average velocity of the volume flow of the exhaust gas in a pipe is determined on basis of the angle between the travelling path of the sonic signals and the volume flow and the length of the travelling path by measuring the run time differences of the sonic signals which are caused by an addition or a substraction of the velocity of the volume flow and the associated components of the speed of the sonic signals, respectively. By multiplying the determined velocity of the volume flow and the cross section of the pipe, the instantaneous average volume flow of the exhaust gas can be determined. In the apparatus described in the dissertation, piezo crystals which are disposed opposite to each other, are used for generating and receiving the sonic signals. Each of the piezo crystals is operated as a transmitter and a receiver at substantially the same time. Due to transient effects or phenomena which are caused as a result of the inertia of the piezo crystals, and which leads to a comparatively large error in the determination of the exact measuring time at which a sonic signal is transmitted or received, the described apparatus has a comparatively low accuracy in determining the volume flow. Moreover, due to the unfavourable vibrational properties of the piezo crystals, the apparatus does not allow for measuring a volume flow with a sufficient time resolution, as it is required for determining and verifying the amount of pollutants generated during a testing cycle. Moreover, it is a disadvantage of the described apparatus that the piezo crystals are in direct contact with the corrosive and hot exhaust gas. As a result of the direct contact between the crystals and the exaust gas, the operational life time of the crystals is strongly reduced and a further measurement error is caused by the thermal behaviour of the piezo crystals.

In addition, the "run time difference method" is also described in the article titled "Dubbel", Edition 18, page W 16, Springerverlag.

SUMMARY OF THE INVENTION

It is accordingly an object of the invention to provide a flow meter which overcomes the above-mentioned disadvantages of the prior art devices and methods of this general type, and which is capable of determining the volume flow of a gas, in particular, an exhaust gas of an internal combustion engine with improved accuracy and time resolution. It is a further object of the invention, to provide for a method and an apparatus which allows for an enhanced measuring accuracy without employing additional sensors, when determining the velocity of a volume flow of a gas in a pipe on basis of the run time difference method.

With the foregoing and other objects in view there is provided, in accordance with the invention, an apparatus for measuring a volume flow of a gaseous medium in a pipe, including a first sonic transmitter which generates first sonic signals; a predetermined path which has a first end and a second end disposed obliquely to the volume flow, the first sonic signals passing the volume flow along the predetermined path from the first end to the second end; a second sonic transmitter which generates second sonic signals, the second sonic signals following the path from the second end to the first end of the path; a first and a second sonic receiver for receiving the first and the second sonic signals after the first and the second sonic signals have traveled the path and for converting the first and the second sonic signals into respective first and second electronic signals; and a control and measuring unit, the control and measuring unit determines a respective run time of the first and the second sonic signals and further determines a speed of the volume flow on the basis of the run times, wherein the first sonic transmitter and the second sonic receiver are disposed relative to each other for causing at least a part of the first sonic signals before traveling the path, to impinge upon the second sonic receiver for generating a first trigger signal used by the control and measuring unit to determine the run times of the first sonic signals.

In accordance with an added feature of the invention, the second sonic transmitter and the first sonic receiver are disposed relative to each other to impinge at least a part of the second sonic signals on the first sonic receiver before traveling along the path for generating a second trigger signal used by the control and measuring unit to determine the run time of the second sonic signals.

In accordance with another feature of the invention, there is a first deflecting mirror which has a reflecting surface and a focus disposed at a given distance from the first sonic transmitter, the first deflecting mirror directs the first sonic signals in a direction towards the first sonic receiver, and the second sonic receiver is disposed in the reflecting surface of the first deflecting mirror.

In accordance with an additional feature of the invention, the first deflecting mirror is a parabolic mirror and the first sonic transmitter is disposed in the focus of the first deflecting mirror.

In accordance with yet another added feature of the invention, there is a second deflecting mirror which has a reflecting surface and a focus disposed at a given distance from the second sonic transmitter, the second deflecting mirror directs the second sonic signals in a direction towards the second sonic receiver, and the first sonic receiver is disposed in the reflecting surface of the second deflecting mirror.

In accordance with yet another feature of the invention, the second deflecting mirror is a parabolic mirror and the second sonic transmitter is disposed in the focus of the second deflecting mirror.

In accordance with yet another additional feature of the invention, there are grids located at least at one of the first end and the second end of the path, the grids are permeable to the first and the second sonic signals and substantially non-permeable to the volume flow.

In accordance with yet a further added feature of the invention, at least one of the first and the second sonic transmitters have an electric spark gap, and the first and the second sonic signals are generated by a spark discharge.

In accordance with yet a further additional feature of the invention, the spark gap has a first and a second electrode, the first and the second electrode each have a tip, and includes a discharge plane disposed between and above the electrodes to generate a defined spark discharge exclusively across the discharge plane.

In accordance with an added feature of the invention, the discharge plane is made of a material including Quartz.

In accordance with another feature of the invention, there is a projection formed of an insulating material, and wherein at least one of the first and the second electrode of the spark gap is spring-biased, the tip of the spring biased electrode is in contact with the projection for automatically compensating for a consumption of the electrode tip.

In accordance with an additional feature of the invention, there is a grid disposed between at least one of the first sonic transmitter and the second sonic receiver and the second sonic transmitter and the first sonic receiver, which is permeable to the sonic signals and is non-permeable to the volume flow.

In accordance with a concomitant feature of the invention, there is a scavenging medium supplied to a space formed between the grid and the sonic receiver.

It is an advantage of the apparatus of the invention that changes in the temperature of an exhaust gas, as they usually occur when testing an internal combustion engine under different load conditions during a testing cycle, do not have a negative influence on the measuring accuracy. Moreover, it is an advantage of the apparatus that the corrosive pollutants and other floating particles or aerosols inherent in exhaust gases of an internal combustion engine do not contact the delicate parts of the apparatus which are used for generating and receiving the sonic signals. As a result, the parts for generating and receiving the sonic signals are not subjected to fouling and resulting in reduced wear and tear and an increased life expectancy of the apparatus.

Other features which are considered as characteristic for the invention are set forth in the appended claims.

Although the invention is illustrated and described herein as embodied in a high precision flow meter for measuring a gaseous volume flow in a pipe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 is a schematic diagram of a principle of a "run time difference method" and associated variables.

DESCRIPTION OF THE PREFERRED EMBODIMENTS

Figure 1:
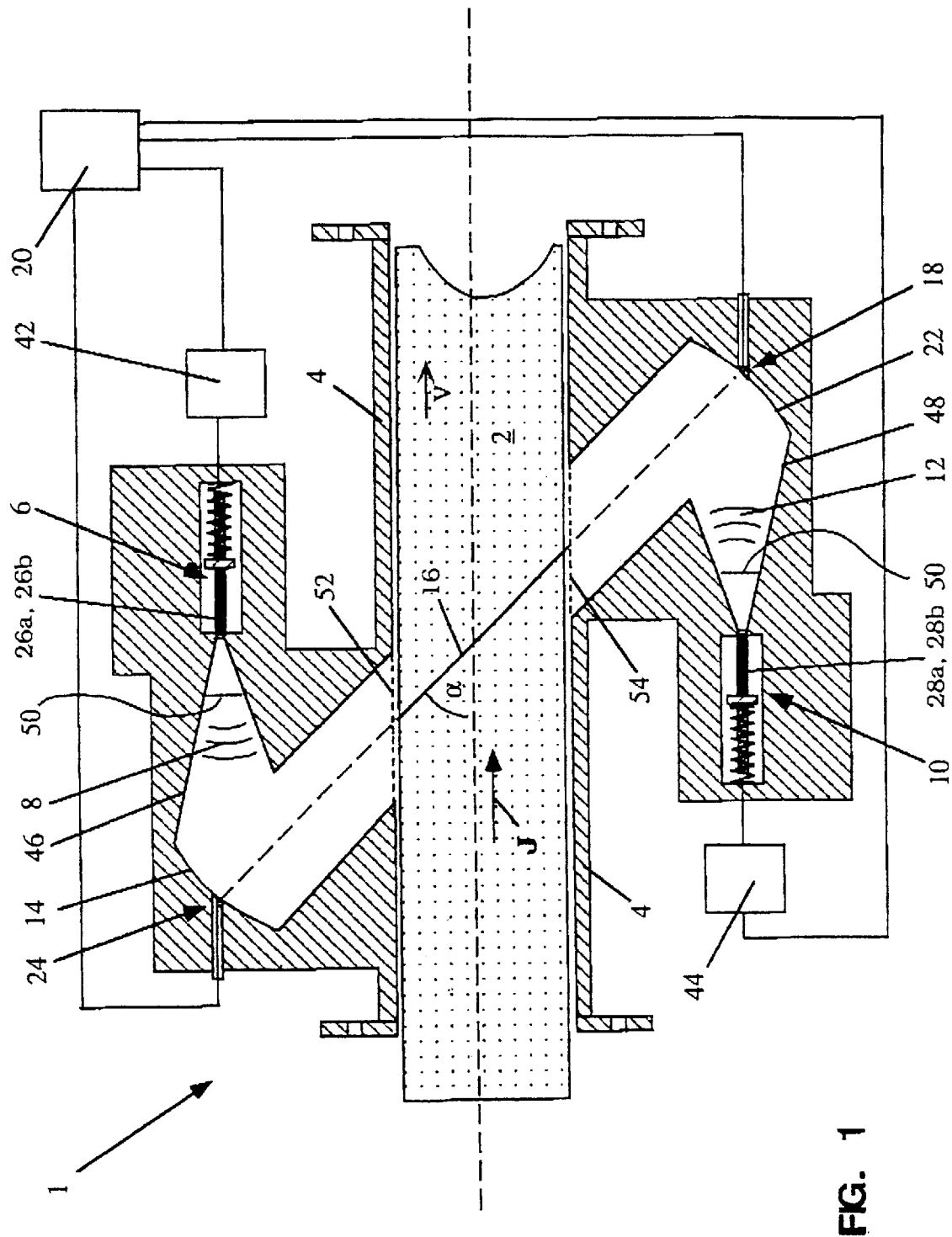
FIG. 1 is a diagrammatic, cross-sectional view of a flow meter according to the invention.

Referring now to the figures of the drawing in detail and first, particularly, to FIG. 1 thereof, there is shown an apparatus 1 for measuring the volume flow J of a gaseous medium 2 in a pipe 4 through which the medium 2 is flowing. The apparatus 1 has a first sonic transmitter 6 for generating first sonic signals 8 and a second sonic transmitter 10 for generating second sonic signals 12. The apparatus 1 further includes a first tilted or deflecting mirror 14 for deflecting the first sonic signals 8 emitted by the first sonic transmitter 6 along a path 16 which is disposed at an angle a relative to the volume flow J. A sonic receiver 18 is disposed at an end of path 16, which converts the first sonic signals 8 into corresponding electronic signals which are supplied to an electronic control and measuring unit 20.

The apparatus 1 further includes a second tilted or deflecting mirror 22 which deflects the second sonic signals 12 of the second sonic transmitter 10 in a direction towards a second sonic receiver 24. The second sonic receiver 24 is preferably located at an entry portion of the path 16 on a side of the pipe 4 which is opposite to the second sonic transmitter 10, such that and unlike the first sonic signals 8, the second sonic signals 12 are traveling along the path 16 in a substantially opposite direction before impinging on the second sonic receiver 24. The second sonic receiver 24 converts the second sonic signals 12 into corresponding electronic signals which are supplied to the electronic control and measuring unit 20.

In the preferred embodiment of the invention, each of the first and second sonic receivers 18, 24 is a known prior art piezo crystal which may be disposed in a center of the deflecting mirrors 14 and 22, as it is shown in FIG. 1, and which may have a size in the range of a few millimeters.

Due to the high resonance frequency associated with the small size of the piezo crystals, the piezo crystals have very short response and settling times. Although the electric signals generated by such piezo crystals have a comparatively small amplitude, the sonic signals generated by a sonic generator can easily and clearly be detected, due to the extremely high amplitudes or pressure of the sonic signals obtained from such a sonic generator. The sonic generator will be described in detail herein below. Due to their comparatively small amplitudes, external sound, disrupting signals or other noise, hardly have an affect on the measurements. Moreover, it may be encompassed to pre-amplify the electric signals generated by the sonic receivers, by an unillustrated Field Effect Transistors (FET) which may be directly mounted to the sonic receivers, before supplying the signals to a further amplifier.

According to a preferred embodiment of the invention, the first and/or the second deflecting mirror 14, 22 may be formed as parabolic mirrors or as partial areas of parabolic mirrors, in order to convert the generated spherical wave fronts into substantially plane-parallel wave fronts. The generation of the first and second sonic signals 8, 12 by the first and second sonic transmitters 6, 10 may preferably be performed in a focus of the parabolic mirrors 14, 22. Alternatively, it is also possible to use other known shapes for the mirrors, so that the apparatus 1 of the invention is not limited to the described parabolic mirrors. The deflecting mirrors 14, 22 may be formed of synthetic materials or plastics.

In the preferred embodiment of the invention, the first and the second sonic signals 8, 12 are generated by first and second spark gaps 25, 27, which are formed by electrodes 26a, 26b of the first sonic transmitter 6 and electrodes 28a, 28b of the second sonic transmitter 10, as they are schematically indicated in FIG. 1. The sonic signals generated by the spark discharges between the electrodes have the form of ultra short delta-peak shaped sonic pulses, having a first peak which is extremely high in comparison with the subsequent sonic pulses. Due to its explosive generation, the first pulse initially propagates on the first 0.5–0.7 centimeters of its propagation path with a speed that is higher than the sonic speed in the gaseous medium 2.

Figure 2:
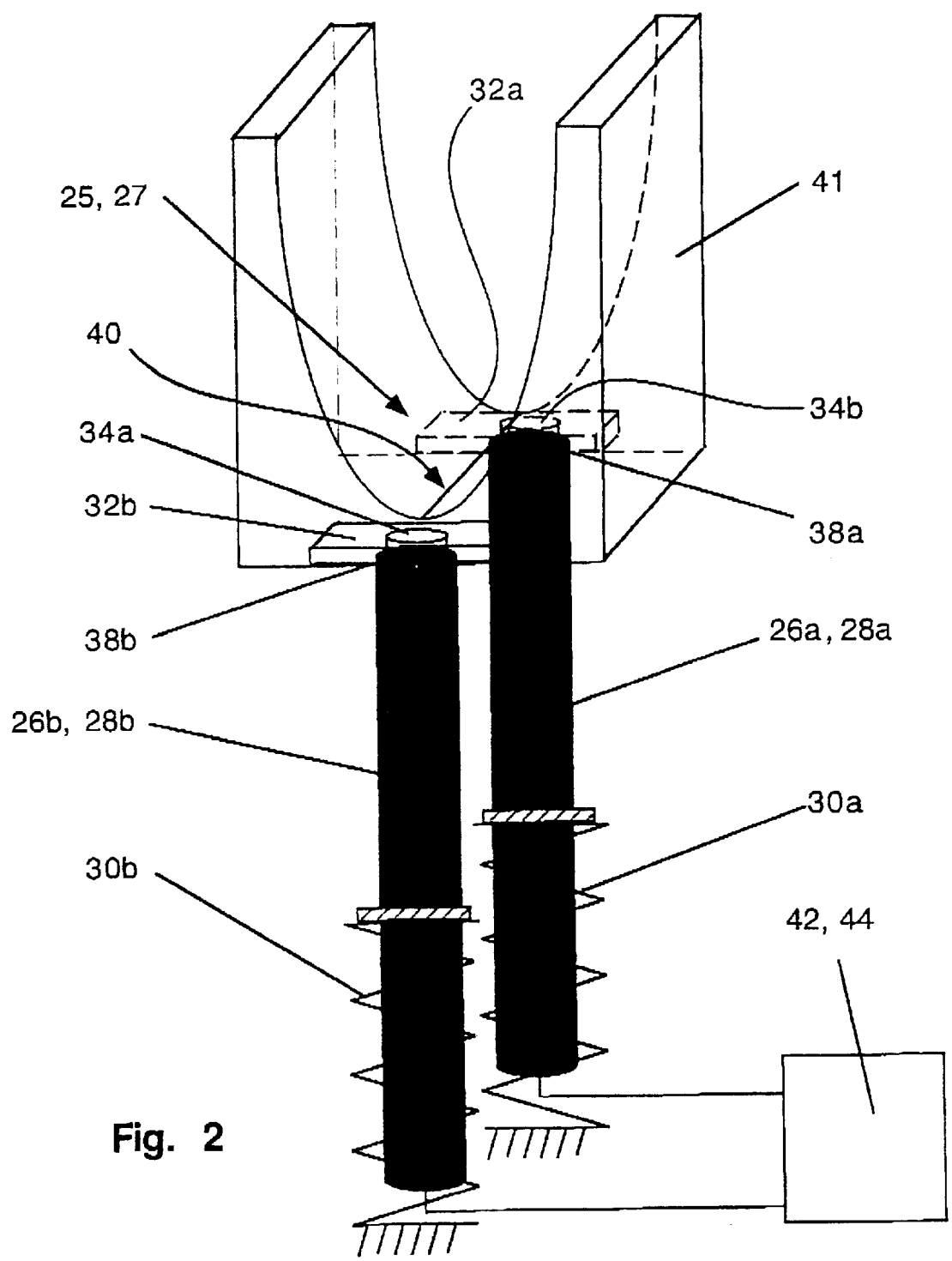
FIG. 2 is a perspective view of a self adjusting electrode configuration as it is used in sonic transmitters of the flow meter.
Figure 3:
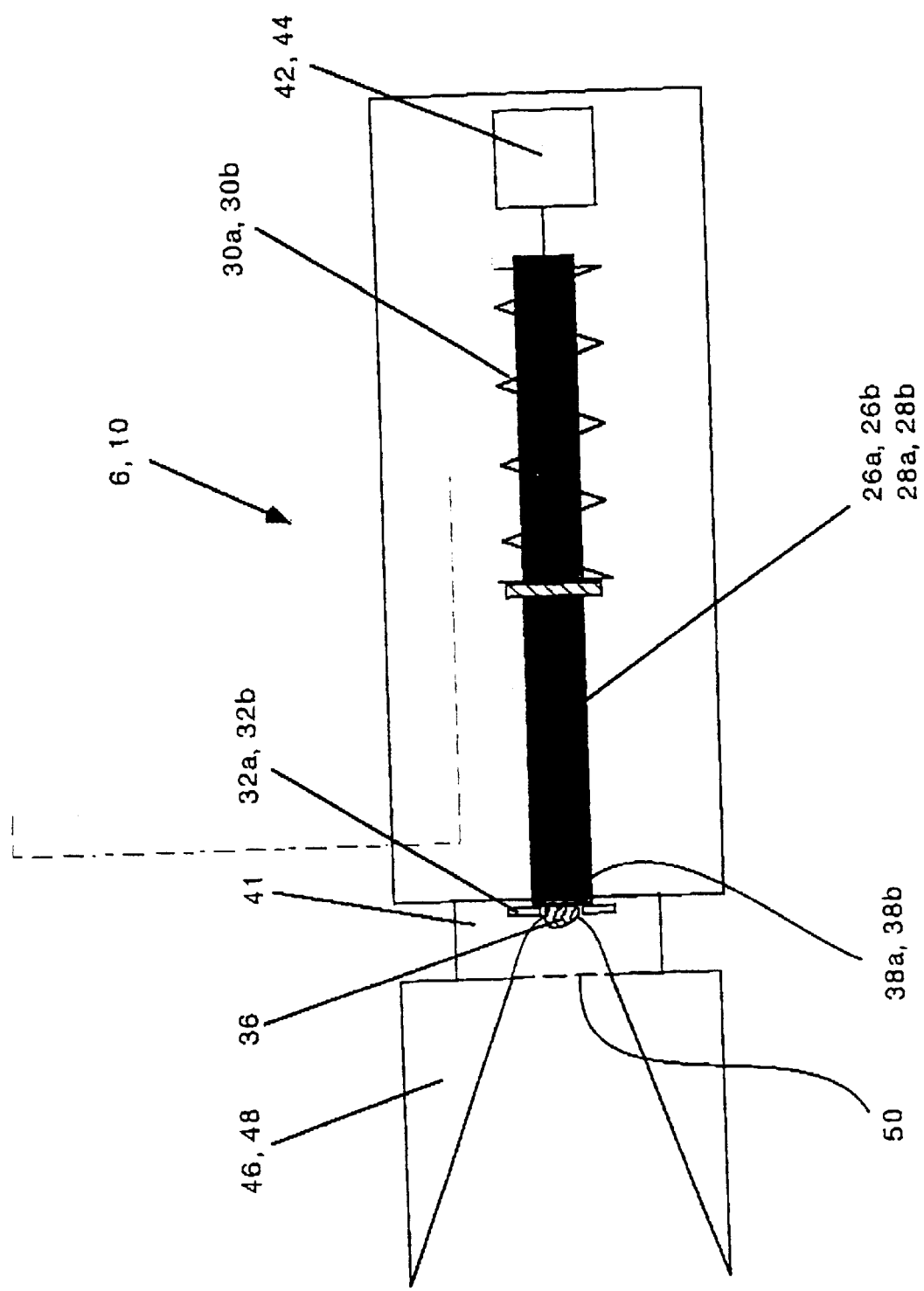
FIG. 3 is a front, elevational view of the electrode configuration of FIG. 2 with an associated spark propagation area and an adjoining funnel-shaped guiding portion for generating sonic signals.

As it is shown in FIG. 2 and 3, the sonic spark transmitters 6, 10 according to the preferred embodiment of the invention may include at least one, but preferably two bar-shaped electrodes 26a, 26b; 28a, 28b. The bar-shaped electrodes may be formed of graphite, platinum, tungsten or another similar materials. The tips 38a, 38b of the electrodes 26a, 26b; 28a, 28b, may be urged against projections 32a, 32b formed of insulating material by resilient elements 30a, 30b. As shown in the FIG. 2, the resilient elements 30a, 30b may be known coil springs. In the projections 32a, 32b formed of insulating material, apertures 34a, 34b may be provided, which may form a passage way for a generated spark 36.

For generating a sparcially and temporarily well defined spark discharge between the electrodes, the tips 38a, 38b, of the electrodes 26a,b, 28a,b, of the first and/or second sonic transmitter 6, 10 are disposed below a discharge plane 40, which is formed between the electrodes in such a way that a defined spark discharge occurs only across the discharge plane 40. As it is shown in FIG. 2 and 3, the discharge plane 40 is preferably formed by a V-shaped notch or recess in a block 41 formed of insulating material such as quartz. Instead of using a V-shaped discharge plane 40, the discharge plane 40 may also be a plane surface; or may be a curved surface such as a U-shaped surface, or a surface of any other known shape. The usage of a discharge plane 40 has the advantage that the deterioration and consumption of the electrodes, as it usually occurs at the cathode, does not lead to a sparcial displacement of the spark 36, which might cause an additional error of measurement. Moreover, the usage of spring biased electrodes 26a, 26b, 28a, 28b having tips 38a, 38b which are urged against the projections 32a, 32b by the resilient devices 30a, 30b, has the advantage that the electrode material which has been removed from the respective tip due to the consumption, is automatically and sufficiently replaced. As a result, it is made sure that the form and the location of the spark 36 does not change over a longer period of time owing to an increasing distance between the two electrode tips 38a, 38b which is caused by electrode consumption.

Furthermore, only the cathode may be provided with an automatic resupply of electrode tip material and may be formed of graphite, whereas the anode can be a fixed NiCr-electrode. Moreover, the feeding of the electrodes 26a, 26b, 28a, 28b can also be performed by a motor or pneumatically. For pneumatically feeding of the electrodes, a gas such as an inert gas or a scavenging gas having a slight over pressure may be supplied into the chamber behind the electrodes 26a, 26b, 28a and 28b. The gas may either directly act onto the electrodes or may act on an unillustrated piston connected to the electrodes, for constantly biasing the electrodes in the direction of the projections 32a, 32b.

Figure 4:
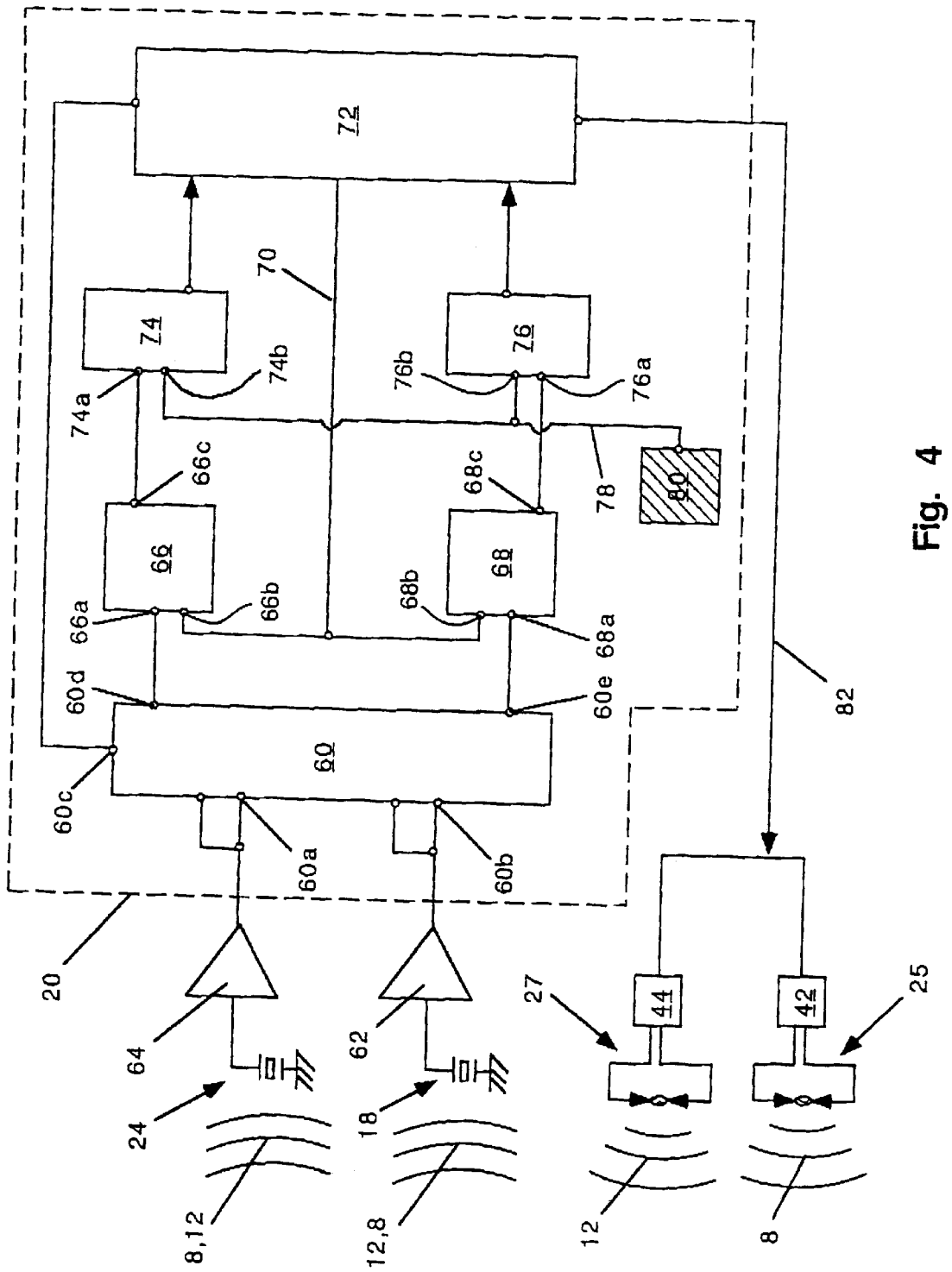
FIG. 4 is a circuit block diagram of electronic components used in the flow meter.

As it is schematically shown in the FIGS. 2–4, the electrodes 26a, 26b, of the first sonic transmitter 6 and the electrodes 28a, 28b of the second sonic transmitter 10 are electrically connected to the first and the second high-voltage generators 42, 44 respectively. The generators 42, 44 are controlled by the electronic control and measuring unit 20 via respective lines which are not indicated by reference numerals.

According to a further exemplary embodiment of the invention, the sonic transmitters 6 and 10 may have associated funnel-shaped guiding portions 46, 48 for directing the first and the second sonic signals 8 and 12 in the direction towards the first and the second deflecting mirrors 14, 22.

Moreover, the guiding portions 46, 48 for the sonic signals may include fine-meshed grids 50, which may be formed of synthetic material or metal, and which are permeable for sonic waves and which protect the spark gaps 25 and 27 of the first and second sonic transmitter 6, 10 against fouling and damage, in particular, when testing corrosive gases, such as exhaust gases of internal combustion engines. Additionally, a scavenging gas such as an inert gas or air, may be supplied to the area of the spark gaps 25, 27, preferably to the area of the electrodes 26a, 26b; 28, 28b. The scavenging gas may penetrate through the grid 50 and may be carried away by the volume flow J. The amount of gas and the width of the grid may be chosen such that the space in the area of the spark gaps 25, 27 is permanently under a slight and constant over pressure, such that substances of the volume flow J to be measured do not penetrate into this area.

In order to provide for additional protection against the penetration of substances or particles from the volume flow J into the area where the first and the second sonic transmitter 6, 10 and the first and second sonic receiver 18, 24 are located, the apertures or openings in the side walls of the pipe 4, through which the first and second sonic signals 8, 12 pass through the volume flow J along the path 16 may include additional grids 52, 54. The grids 52, 54 may also be permeable to the sonic signals 8, 12 but may form a barrier against the volume flow J in the pipe 4. In the same way, as it has been described before with respect to the grids 50, a scavenging medium may also be supplied to the area between the grids 50 and 52 of the first sonic transmitter 6 and/or the grids 50 and 54 of the second sonic transmitter 10, which may also may be under a slight, but constant over pressure.

Measuring Principle:

The measuring principle on which the apparatus according to the invention is based and which is known in prior art literature as "run time difference method", will now be described with respect to FIG. 6. As shown in FIG. 6, a first and a second sonic transmitter and receiver unit $SE_1$, $SE_2$, are disposed opposite to each other at a distance L obliquely to a pipe 4 through which a volume flow J is flowing. The sonic transmitter and receiver units $SE_1$, and $SE_2$ emit sonic pulses at substantially the same time. The emitted sonic pulses pass through the pipe 4 at an angle α and strike the respective opposite units $SE_2$, $SE_1$, which convert the sonic pulses into corresponding electronic signals. Due to the velocity of the volume flow J in the pipe 4 and the vectorial superposition of the components of the sonic speed c in the flowing direction of the volume flow J, the run time differences $T_+$ and $T_-$ of the sonic pulses in the respective running direction of the sonic pulses are given by:

$$T_+ = L/(c - V \cdot \cos \alpha)$$

and $$T_- = L/(c - V \cdot \cos \alpha),$$

wherein L is the length of the path distance 16 within the volume flow J.

From the equation, the mean velocity V of the gaseous medium 2 over the cross section of the pipe 4 may be determined as $$V = L(1/T_+ - 1/T_-)/(2 \cdot \cos \alpha)$$

by transforming and eliminating the sonic speed c parameter.

By measuring the run times $T_+$ and $T_-$ of the first and the second sonic pulses, the velocity V of the medium 2 can be directly determined from the equation; and the volume flow J may be obtained by multiplying the velocity V of the medium 2 with the cross section of the pipe 4.

In practice however, the measured run times $T_+$ and $T_-$ of the sonic signals together with the corresponding values for the volume flow J, which may be obtained by calibration, are preferably stored as fixed values in an electronic memory.

During the measuring process, the stored values may be retrieved from the electronic memory by a computer in a way known in the art.

Moreover, the actual run times may differ from the measured values $T_+$ and $T_-$ by a substantially constant offset value. The offset value results from the transmitter/receiver units $SE_1$ and $SE_2$ (in the same way, as the sonic transmitters and sonic receivers of the flow meter according to the present invention) being disposed at a distance from the pipe 4 and/or from the volume flow J. Since the offset value is a constant value, it can be easily compensated for (e.g. by subtraction), so that it will not be further considered hereinafter.

Figure 5:
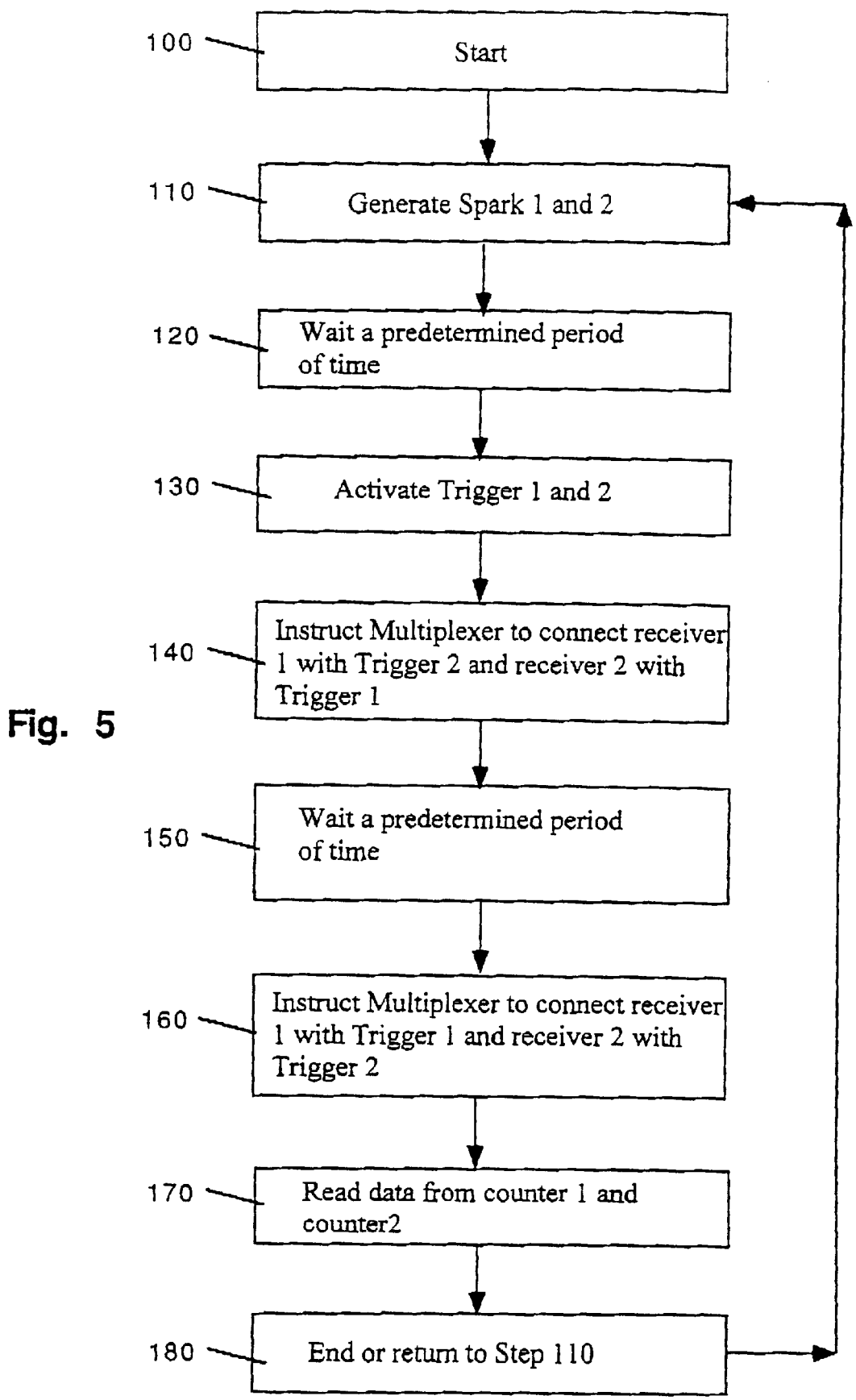
FIG. 5 is a flow diagram of the operation of an electronic evaluating unit.

Operating principle of the apparatus according to the present invention:

The operating principle of the apparatus 1, in particular the electronic control and measuring unit 20, will be described below with reference to FIGS. 4 and 5.

As it is schematically shown in FIG. 4, the electronic control and measuring unit 20 of the preferred embodiment of the invention has a multiplexer 60, whose first inputs 60a, 60b are connected to the second and first sonic receivers 24 and 18 via a first and a second amplifier 62, 64. The first and second sonic receivers 18, 24 supply first and second electronic signals to the first inputs 60a, 60b of the multiplexer 60, which substantially correspond to the first and second sonic signals 8, 12 received by the sonic receivers 18, 24. The outputs 60d, 60e of the multiplexer 60 are connected to the first inputs 66a and 68a of a first and a second trigger 66, 68. A further control input 60c of the multiplexer 60 is connected to a microprocessor 72 which supplies control signals to the multiplexer 60. In dependence on the control signals, the multiplexer 60 alternately associates the first inputs 60a, 60b of the multiplexer 60 with the first and second outputs 60d, 60e of the multiplexer 60. The second inputs 66b, 68b of the first and the second trigger 66, 68 are connected to the microprocessor 72 via a common control line 70. The microprocessor 72 supplies threshold signals for fixing a predetermined trigger threshold to the first and second inputs 66b, 68b of the first and second trigger 66, 68. The outputs 66c, 68c of the first and the second trigger 66, 68 are electrically connected to the inputs 74a and 76a of a first and a second electronic counter 74, 76 whose counters receive respective start signals from the triggers 66, 68, if the amplitude of the first and second sonic signals 8, 12 which are measured by the sonic receivers 18, 24 exceed a certain value which is determined by the respective triggers threshold. The second inputs 74b, 76b of the first and the second counter 74, 76 are connected via a common line 78 to a clock generator or clock 80, which generates normalized pulses with a frequency of for example 100 Mhz which are supplied to the second inputs 74b, 76b of the first and second counters 74, 76.

The method according to which the electronic control and measuring unit 20 determines the velocity of the volume flow J in pipe 4 will now be described with reference to the flow diagram of FIG. 5 and the electronic circuit shown in FIG. 4.

After starting the measurement process in step 100, the control and measuring unit 20 in step 110 sends a signal to the first and second high voltage generators 42, 44 via the control unit 72 shown in FIG. 4, which signal causes the high voltage generators 42, 44 to generate a spark discharge on the first and second spark gaps 25, 27 respectively. The high voltage generators 42, 44 may be simple capacitors, which have been charged. The spark discharges generate the first and second sonic signals 8, 12 at substantially the same times, which then propagate in the direction of the first and second deflecting mirrors 14, 22, respectively, as substantially planar sonic waves. Due to the explosive generation and amplitude of the sonic signals, the signals initially propagate with a speed which is higher than the sonic speed in the gaseous medium.

Afterwards, in step 120, the microprocessor 72 performs a predetermined wait state, to allow the first and second sonic signals 8, 12 to get close to the first and second deflecting mirrors 14, 22 or the second and first sonic receivers 24, 18 located in the deflecting mirrors 14, 22 respectively. The length of the wait state depends on the distance between the spark gaps 25, 27 and the corresponding receivers 24, 18 and is preferably adjustable by software. In the preferred embodiment of the invention, in which the distance between the spark gaps 27, 25 and the associated sonic receivers 18, 24 is in the range of 5 to 7 cm, the time may be in the range of 100 to 150 ms. The wait state in step 120 serves for minimizing a disturbance of the measurement by noise signals, which may occur during the transmission of one of the sonic signals 8, 12 at the spark gap 25, 27 and the receiving of the respective sonic signal by the associated sonic receiver 24, 18.

In a next step 130, the microprocessor 72 activates the first and the second trigger 66, 68. This is performed for example by supplying a trigger threshold signal of a predetermined value to the second inputs 66b and 68b of the first and second trigger 66, 68.

The first and second sonic signals 8, 12 impinging on the second and first sonic receiver 24, 18 some moments later, are converted into respective second and first electronic signals, which are supplied to the first and second trigger 66, 68. Due to their size, the first and second sonic signals or more precisely the corresponding electronic signals exceed the trigger threshold set by the microprocessor 72 to the first and second inputs 66b, 68b of the triggers 66, 68, the triggers 66, 68 become conductive and supply respective starting signals to the inputs 74a, 76a of the first and second counter 74, 76, by which the counters begin counting the number of pulses of the clock generator 80.

In step 140, the microprocessor 72 instructs the multiplexer 60, by supplying a respective control signal to the control input 60c of the multiplexer 60, to connect the first input 60a of the multiplexer 60 with the first output 60d of the multiplexer 60 and to connect the second input 60b of the multiplexer 60 with the second output 60e thereof. As a result, the signals of the first sonic receiver 18 are supplied to the second trigger 68 and the signals of the second sonic receiver 24 are supplied to the first trigger 66.

In a further step 150, the microprocessor 72 performs a further predetermined wait state, until the first and the second sonic signals 8, 12 have nearly reached the first and second receivers 18, 24. The length of the wait state is preferably adjustable. In a preferred embodiment of the invention, in which the distance between the deflecting mirrors 14, 22 is approximately in the range of 20 cm, the length of the wait state is approximately 600 ms. In the same way as described before with reference to step 120, the further wait state of the microprocessor 72 serves for eliminating possible noise signals, as they may occur in an internal combustion engine, whose exhaust gas flow is being tested. By performing predetermined wait states in steps 120 and 140, the measuring accuracy and the immunity of the apparatus 1 of the invention against disturbing noise signals can be considerably improved. However, the usage of a wait state in steps 120 and 140 is not necessarily required, so that the apparatus 1 can also be operated without using wait states.

In a further step 160 subsequent to step 150, the microprocessor 72 instructs the multiplexer 60 by supplying a respective control signal to the control input 60c of the multiplexer 60, to connect the second input 60b of the multiplexer 60 with the first output 60d of the multiplexer; and to connect the first input 60a of the multiplexer 60 with the second output 60e thereof, such that the signals of the first sonic receiver 18 are supplied to the first trigger 66 and the signals of the second sonic receiver 24 are supplied to the second trigger 68.

The first and the second sonic signals 8, 12, which are received by the first and second sonic receivers 18, 24 some moments later, after having passed through the volume flow J or more precisely the electronic signals corresponding to the first and second sonic signals 8, 12, are compared by the first and the second trigger 66, 68 with the threshold signals supplied to the second input 66b, 68b of the first and second trigger 66, 68. Due to size of the signals, the first and the second triggers 66, 68 become conductive and the first inputs 74a and 76a of the first and second counters 74, 76 receive a respective stop signal, which stops the counting process of the counters 74, 76, respectively.

In a further step 170, the microprocessor 72 retrieves the respective values of the first and second counters 74, 76 which correspond to the measured run times $T_+$ and $T_-$ and determines the volume flow J in the pipe 4 on the basis of the run times $T_+$ and $T_-$. The determination of the volume flow J in the pipe 4 can be performed by transforming the values of the first and second counters 74, 76 into associated values which directly correspond to the run times $T_+$ and $T_-$, and inserting those values into the above described equation. However, in the preferred embodiment of the invention, the value of the volume flow J is directly determined by the microprocessor 72 by comparing the values of the counters 74, 76 with respective previously stored values for the counters and their associated values for the volume flow J, which may have been obtained by calibration and which may be stored in the memory in form of a matrix or a tabular.

In step 180, the microprocessor 72 returns to step 110, if the measurement is not stopped, whereby the counters 74, 76 may be reset.

Eventually, it may also be encompassed that the measured values for the run times $T_+$ and $T_-$ or the corresponding values for the first and the second counters 74, 76 are corrected by a correction value which accounts for the small, but not negligible dependency of the sonic speed c from the amplitude of the sonic signals which is not always constant. In the preferred embodiment of the invention, the measuring error of the run times $T_+$ and $T_-$ can be up to 0.15 %.

For correcting the run times, $T_+$ and $T_-$, the amplitude of the first incoming sonic pulses of the first and second sonic signals 8, 12 are measured by the second and first sonic receivers 24, 18 according to an exemplary embodiment of the invention. The measured amplitude values are afterwards compared with amplitudes values which are stored e.g. in a tabular or matrix in the memory of the control and measurement unit 20 together with associated correction values which may have been obtained e.g. by calibration.

By adding the correction values to the previously determined run times $T_+$ and $T_-$, or to the values retrieved from the counters 74, 76, the new corrected values for the run times may be obtained. From the new corrected values for the run times $T_+$ and $T_-$, the corrected value for the volume flow J may afterwards be obtained in the way as set forth above.

Although in the apparatus 1 of the invention, the first and the second sonic transmitter 6, 10 preferably include a spark gap 25, 27, the sonic transmitters 6, 10 may also be known prior art transmitters, e. g. piezo crystals or known loudspeakers. Moreover, it is also conceivable to replace the sonic receivers of the present invention by a conventional microphone or by a glow-discharge gap, which converts the sonic signals into corresponding electric signals by measuring the changes in the current of the glow-discharge and/or the light emitted from the glow-discharge gap.

Although the apparatus and the method according to the invention have been described with reference to the measurement of the volume flow of an exhaust gas flowing through a pipe section, the principle of the invention is not limited thereto.

In the same way, the principle and the apparatus of the invention may be used for generally determining the speed V of a volume flow of gases, e. g. in outgoing air systems, in analyzing technology, for measuring wind speed, for determining the exhaust velocity of rocket engines or in physical experiments etc.

I claim:

1. An apparatus for measuring a volume flow of a gaseous medium in a pipe, comprising:

a first sonic transmitter for generating first sonic signals;

a predetermined path having a first end and a second end disposed obliquely to a volume flow, said first sonic signals passing the volume flow along said predetermined path from said first end to said second end;

a second sonic transmitter for generating second sonic signals, said second sonic signals following said path from said second end to said first end of said path;

a first and a second sonic receiver for receiving said first and said second sonic signals after said first and said second sonic signals have traveled said path and for converting said first and said second sonic signals into respective first and second electronic signals; and a control and measuring unit, said control and measuring unit determining a respective run time of said first and said second sonic signals and further determining a speed of the volume flow on a basis of said run times, said first sonic transmitter and said second sonic receiver disposed relative to each other for causing at least a part of said first sonic signals before traveling said path, to impinge upon said second sonic receiver for generating a first trigger signal used by said control and measuring unit for determining the run times of said first sonic signals.

2. The apparatus according to claim 1, wherein said second sonic transmitter and said first sonic receiver are disposed relative to each other for impinging at least a part of said second sonic signals on said first sonic receiver before traveling along said path for generating a second trigger signal used by said control and measuring unit for determining said run time of said second sonic signals.

3. The apparatus according to claim 1, including a first deflecting mirror having a reflecting surface and a focus disposed at a given distance from said first sonic transmitter, said first deflecting mirror directing said first sonic signals in a direction towards said first sonic receiver, and said second sonic receiver disposed in said reflecting surface of said first deflecting mirror.

4. The apparatus according to claim 3, wherein said first deflecting mirror is a parabolic mirror and said first sonic transmitter is disposed in said focus of said first deflecting mirror.

5. The apparatus according to claim 2, including a second deflecting mirror having a reflecting surface and a focus disposed at a given distance from said second sonic transmitter, said second deflecting mirror directing said second sonic signals in a direction towards said second sonic receiver, and said first sonic receiver disposed in said reflecting surface of said second deflecting mirror.

6. The apparatus according to claim 5, wherein said second deflecting mirror is a parabolic mirror and said second sonic transmitter is disposed in said focus of said second deflecting mirror.

7. The apparatus according to claim 1, including grids located at least one at of said first end and said second end of said path, said grids being permeable to said first and said second sonic signals and substantially non-permeable to the volume flow.

8. The apparatus according to claim 1, wherein at least one of said first and said second sonic transmitters have an electric spark gap, and said first and said second sonic signals are generated by a spark discharge.

9. The apparatus according to claim 8, wherein said spark gap has a first and a second electrode, said first and said second electrode each have a tip, and including a discharge plane disposed between and above said electrodes for generating a defined spark discharge exclusively across said discharge plane.

10. The apparatus according to claim 9, wherein said discharge plane is made of a material including Quartz.

11. The apparatus according to claim 8, including a projection formed of an insulating material, and wherein at least one of said first and said second electrode of said spark gap is spring-biased, said tip of said spring biased electrode is in contact with said projection for automatically compensating for a consumption of said electrode tip.

12. The apparatus according to claim 11, including a grid disposed between at least one of said first sonic transmitter and said second sonic receiver and said second sonic transmitter and said first sonic receiver, which is permeable to said sonic signals and is non-permeable to said volume flow.

13. The apparatus according to claim 12, including a scavenging medium supplied to a space formed between said grid and said sonic receiver.

* * * * *